Nov. 4, 1930.   F. L. SEELEY ET AL   1,780,277
SHIPPING DEVICE
Filed Jan. 5, 1929
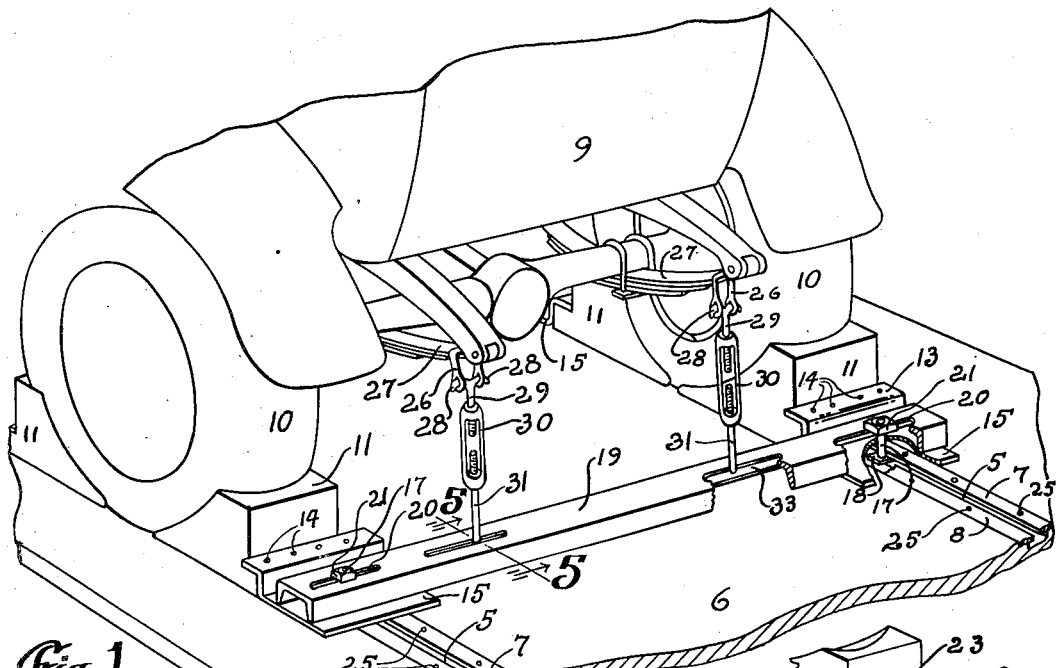
Fig. 1.
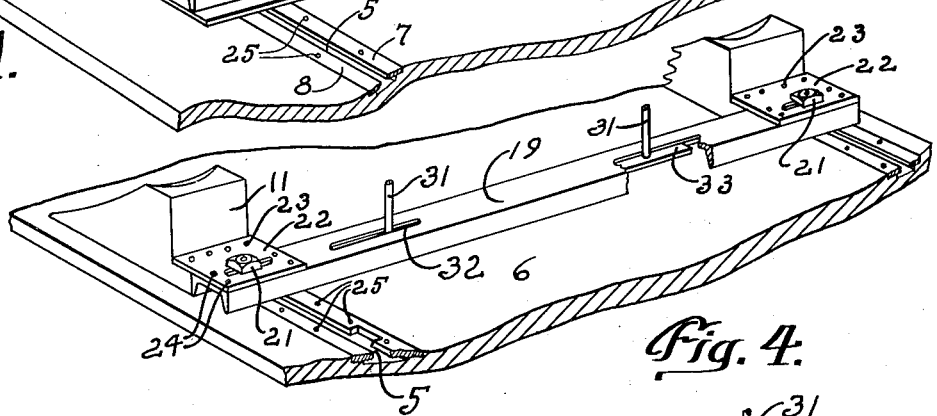
Fig. 4.
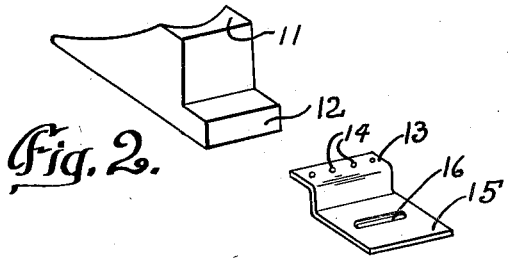
Fig. 2.
Fig. 3.
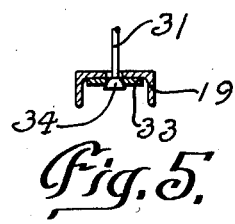
Fig. 5.
INVENTORS.
FAY L. SEELEY AND
CLIFFORD L. SNYDER.
BY
Harness, Dickey & Pierce
ATTORNEYS Patented Nov. 4, 1930

1,780,277

UNITED STATES PATENT OFFICE

FAY L. SEELEY AND CLIFFORD L. SNYDER, OF DETROIT, MICHIGAN, ASSIGNOR TO THE EVANS AUTO LOADING CO. INC., OF DETROIT, MICHIGAN, A CORPORATION OF DELAWARE

SHIPPING DEVICE

Application filed January 5, 1929. Serial No. 330,544.

The subject matter of this invention is generally directed to shipping devices which are adapted or intended for use in the shipment of motor vehicles. The primary object of our invention is to provide a simple and economical device by which a motor vehicle may be secured to the floor of a freight car or other suitable carrier without driving nails, screws or the like in the floor of the car.

More specifically, our invention contemplates the utilizing in a device of this character of a chock or block, which is composed of wood or other similar suitable material, for bracing the wheels of the vehicle, together with means for holding the vehicle anchored to the floor. Another object is to combine the blocking and anchoring devices in so far as their attachment to the freight car floor is concerned so that a single means for attaching them may be employed.

Other and more specific objects of our invention will be readily apparent from a perusal of the accompanying specification.

With the above and other objects in view, our invention consists in the arrangement, combination and construction of the various parts of our improved device as described in the specification, claimed in our claims and shown in the accompanying drawings, in which:

Fig. 1 is a perspective view, with certain parts broken away, showing the rear end of a motor vehicle secured to the floor of a freight car in accordance with our invention.

Fig. 2 is a perspective view of a bracing block such as is used in our invention.

Fig. 3 is a perspective view of an anchoring plate or bracket such as is utilized in our invention.

Fig. 4 is a perspective view of a modified form of shipping device, similar to the one disclosed in Fig. 1, the same being shown as secured to a freight car floor.

Fig. 5 is a cross sectional view taken on line 5—5 of Fig. 1.

When motor vehicles are placed in freight cars for shipment it quite generally becomes necessary to place bracing blocks or chocks on each side of the wheels of the vehicle so as to prevent forward and backward movement of the vehicle, and it is likewise often necessary to provide means for holding the vehicle to the floor so that it may not be thrown out of engagement with the bracing blocks or chocks. These devices are generally referred to in the industry as "hold-downs."

In order to do away with the destructive methods now generally used, which consists in nailing or screwing the chocks and the hold-downs to the floor, it has been proposed that grooves be cut in the floor, which grooves may assume the shape of inverted T slots either by being formed to that shape or by the provision of a pair of plates which are secured on either side of a groove and which overlap the edges of the groove.

In the form herein shown, we provide grooves 5 in a freight car floor 6 and secure a pair of plates 7 and 8 on either side of said grooves, the adjacent edges of the plates overlapping the groove so as to provide a bearing surface for the head or heads of a bolt or bolts which may be extended into the groove from above the same.

Mounted on the floor 6 is a motor vehicle which we have indicated generally as 9, said vehicle having wheels 10 thereon. On each side of each wheel 10 we provide a block or chock 11. Each chock 11 is grooved on its face adjacent the wheel 10 so as to receive the wheel and is provided with a lower horizontal rearward extension 12. In the form of our invention illustrated in Figs. 1, 2 and 3 the top of the extension 12 is engaged by the arm 13 of a Z shaped plate or bracket. The chock and plate may be secured together by nails, screws or the like as at 14.

The leg 15 of the plate or bracket is adapted to rest on the freight car floor and on the strips 7 and 8. It may be provided with an elongated slot 16 through which the shank of a bolt 17 extends. The lower end of the bolt 17 is provided with a head 18 which is engaged in the slot 5 beneath the plates 7 and 8.

It will be noted that a pair of grooves 5 and corresponding plates 7 and 8 are provided, the grooves being spaced equally with the spacing of the wheels 10 of the vehicle. Likewise a pair of spaced chocks and angle plates or brackets are provided. These are usually placed on each side of each wheel, but we have shown the details of construction for only one side, it being understood that the construction for the opposite will be identical with that shown.

We also provide a channel bar 19, the ends of which extend across the portions 15 of the pair of Z shaped brackets and are provided with elongated slots 20 through each of which the shank of the adjacent bolt 17 extends. Each bolt 17 is provided with a nut 21, which secures the channel member 19 over the portion 15 of each Z bracket and likewise to the freight car floor, through the grooves 5.

In the construction as shown in Fig. 4, the member which secures the chock 11 to the floor and to the channel member 19 consists of a flat plate 22 instead of a Z plate. One portion of this plate 22 overlies the portion 12 of the block and may be secured thereto by nails 23, while the other portion overlies the channel member 19 and may be permanently or removably secured thereto by rivets, bolts or the like as at 24.

In either event the chocks are securely held to the floor of the car without nailing through them into the car floor. The nails or screws 25 which secure the plates 7 and 8 to the car floor are not removed when it is desired to use the freight car for other than vehicle shipping purposes and are, therefore, permanently attached to the car floor.

In order to hold the motor vehicle against vertical displacement relative to the freight car floor and the chocks 11, we have shown a U shaped member 26, the bridge of which engages over a spring 27 of the vehicle and the legs of which are sprung over the ends 28 of an arm 29. The lower end of the arm 29 is threaded into one end of a turnbuckle 30. The outer end of the turnbuckle 30 is threaded to the upper end of an arm 31. The lower end of the arm 31 extends through an elongated slot 32 in the channel member 19 and through a reinforcing plate 33 within the channel. A head 34 on the extreme lower end of the arm 31 prevents the accidental dislocation of the lower end of the arm from the channel piece 19. The seat for the head 34 may be curved or spherical and the head may be of the same contour, as shown in Fig. 5, so as to permit a slight working or swaying of the arm 31 without tending to break or bend the same. It will be readily understood that two of these hold-down devices are provided, one for each spring at one end of the vehicle and that adjustment is made by the turning of a turnbuckle 30 so as to make a tight connection between the channel piece 19 and the springs 27 and thereby effectually hold the vehicle to the floor of the car. It will be apparent that these hold-down devices likewise are not secured to the floor of the freight car by means of removable nails, screws or the like so that the freight car floor is not in any sense damaged by the utilization of hold-downs. It will be obvious that the construction of the hold-down may be varied to suit conditions. We have herein described and disclosed only one operable form of device.

By virtue of the slots in the various securing portions of the device accommodation may be had for varying widths of vehicles and by virtue of the inter-connection of the attaching means for the hold-downs and the chocks, a simple and efficient means for each of them is provided, neither of which is fastened directly to the freight car floor by removable nails, screws or the like, which, by virtue of their attachment and removal, will damage the freight car floor.

It will be readily seen that by virtue of the use of wooden chocks the weight of the shipping devices is materially lessened; also that chocks may be varied so as to conform the grooves therein to the size of the tires used on different makes of vehicles.

It will be obvious that various changes may be made in the arrangement, combination and construction of the various parts of our improved device without departing from the spirit of our invention.

What we claim is:

1. In combination, a vehicle chock positioned in alignment with a wheel of the vehicle and a vehicle hold-down positioned out of alignment with such wheel of the vehicle and common means for securing the two to a support.

2. In combination, a pair of spaced wheel chocks, a pair of spaced vehicle hold-downs and means extending transversely of the chocks connecting all of said members together.

3. In combination, a pair of spaced wheel chocks, a pair of spaced vehicle hold-downs and means connecting all of said members together, said means comprising a member extended between and transversely of the chocks and connected to the hold-downs at their lower ends.

4. In combination, a pair of spaced wheel chocks, means extending transversely of and connecting said chocks together and a vehicle hold-down connected to said connecting means.

5. In combination, a pair of spaced wheel chocks, means extending transversely of and between said chocks and secured, together with the chocks, to a support, and a vehicle hold-down secured to said means.

6. In combination, a pair of spaced wheel chocks, a channel member connecting the chocks, a reinforcing strip in the channel and a vehicle hold-down connected to the channel member through the reinforcing strip.

7. In combination, a pair of spaced wheel chocks, means connecting said chocks together and a vehicle hold-down connected to said connecting means, said hold-down having a ball and socket connection with the connection means.

8. In combination, a pair of spaced wheel chocks, means extending transversely of and connecting said chocks together and a vehicle hold-down connected to said connecting means, said hold-down being swingable relative to the connecting means.

9. In combination, a pair of vehicle chocks, each comprising a wheel engaging member and a securing member, means extending transversely of and between the chocks and having attached thereto a vehicle holddown, and means for securing said chocks and said first means to a support.

10. In combination, a pair of vehicle chocks, each comprising a wheel engaging member and a securing member, means extending between the chocks and having attached thereto a vehicle hold-down, and means for securing said chocks and said first means to a support, said latter means being common to both the first means and the chocks.

11. In combination, a pair of vehicle chocks, each comprising a wheel engaging member and a securing member, means extending between the chocks and having attached thereto a vehicle hold-down, and means for securing said chocks and said first means to a support, said latter means comprising a bolt extended through each end of the first said means and through a portion of the chocks.

12. A vehicle chock comprising a wheel engaging member and a securing member, the latter being generally Z shaped, having one leg resting on a support, and the other over a portion of the first said member.

13. In combination, a pair of vehicle chocks, each comprising a wheel engaging member and a securing member, and means extended between the securing members and secured to them and to a support said means being extended transversely of the chocks.

14. In combination, a pair of vehicle chocks, each comprising a wheel engaging member and a securing member, and means extended between the securing members and secured to them and to a support, said securing members each comprising a plate having one portion engaged with its wheel engaging member and another portion engaged with said means.

15. A chock comprising a wheel engaging member and a somewhat Z-shaped brace therefor.

16. In combination, a pair of spaced members positioned adjacent a pair of wheel, a pair of wheel engaging members, each being braced by said first member, a member extended between said first pair of members and secured, through the same, to a supporting surface.

17. In combination, a pair of spaced members positioned adjacent a pair of wheels, a pair of wheel engaging members, each being braced by said first member and removably secured thereto, a member extended between said first pair of members and secured, through the same, to a supporting surface.

FAY L. SEELEY.
CLIFFORD L. SNYDER.